March 23, 1926. Re. 16,296

G. JAEGER

CONCRETE MIXER

Original Filed Feb. 7, 1924 2 Sheets-Sheet 1

Inventor
GEBHARD JAEGER
by Fenwick & Fenwick
his Attorneys.

March 23, 1926. Re. 16,296

G. JAEGER

CONCRETE MIXER

Original Filed Feb. 7, 1924 2 Sheets-Sheet 2

Inventor
GEBHARD JAEGER
by Fairbanks & Fairbanks
his Attorneys

Reissued Mar. 23, 1926. Re. 16,296

UNITED STATES PATENT OFFICE.

GEBHARD JAEGER, OF COLUMBUS, OHIO, ASSIGNOR TO THE JAEGER MACHINE COMPANY, OF COLUMBUS, OHIO, A CORPORATION OF OHIO.

CONCRETE MIXER.

Original No. 1,535,159, dated April 28, 1925, Serial No. 691,293, filed February 7, 1924. Application for reissue filed February 10, 1926. Serial No. 87,444.

*To all whom it may concern:*

Be it known that I, GEBHARD JAEGER, a citizen of the United States, residing at Columbus, in the county of Franklin and State of Ohio, have invented a certain new and useful Improvement in Concrete Mixers, of which the following is a specification.

The portable concrete mixing machines of the type that has its mixing vessel made with a single opening for the feed and discharge of the component materials usually has such vessel mounted in a frame with a skid or more commonly upon a wheeled truck to facilitate its movement from job to job. Such a mixer is usually provided with a loader bucket for feeding the materials to the mixing vessel pivoted to the frame of the machine and suitable power mechanism for raising it to mixing vessel-feeding position and then lowering it to the ground for the reception of a fresh supply. As it is important that the loader bucket shall lie as closely to the mixer as practicable and as it must be raised to a relatively high point to deliver the materials to the mixing vessel it is a desideratum that a long radius of swing of the bucket to mixer feeding position be avoided.

Several varieties of means have been proposed and illustrated in patents for accomplishing these results and the object of the present invention is to provide improved and simplified means to the same ends.

The present invention is embodied in the construction herein shown and described the features of novelty being finally claimed.

In the accompanying drawings—

Figure 1:
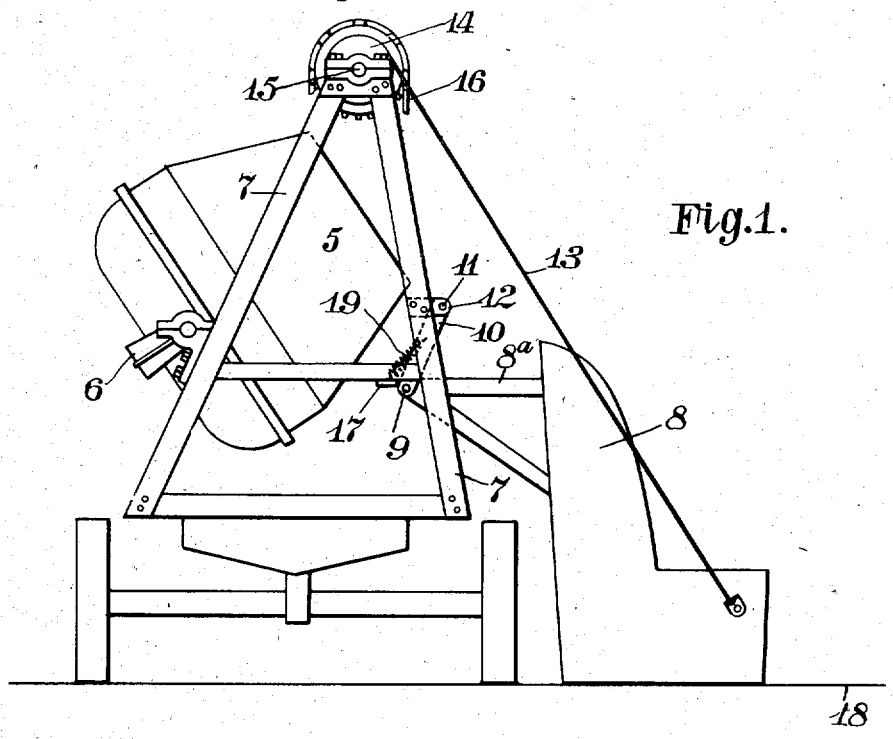
Figure 1 is a view in side elevation illustrating a mixing vessel or drum and loader equipped with my invention showing the loader on the ground with some operating parts omitted for the sake of clearness of illustration.

In the views 5 designates the mixing vessel which is mounted upon a center spindle in a swinging yoke 6 journaled in bearings in a suitable frame 7. Such a mixing drum is usually turned on its axis by means of suitable power and the yoke 6 is usually provided with means whereby it may be manually swung from left to right for shifting the drum from charging to discharging position and conversely.

8 designates the loading bucket it being provided with rear extensions 8ª the ends of which are hinged at 9 to a link frame 10 that in turn is hinged at 11 to the main frame 7 or suitable ears 12 projecting therefrom. The frame 10 constitutes a pendent swinging link connecting the loader bucket to the main frame. The loader bucket is also equipped with a cable or cables 13 for raising and lowering it, said cables winding on a drum or drums 14 fixed on a shaft 15 journaled in the upper end of the main frame. The shaft 15 is driven by a sprocket chain 16 traveling around a sprocket wheel on the end of the shaft, said cable being driven by an engine (not shown) but well understood and as in common use.

The main frame is provided with a suitable stop at 17 to limit the leftward oscillation of the link frame 10 and to afford a purchase for the weight of the bucket in its initial swing upward. This stop is advantageously located at a point somewhat to the left of the vertical line from the hinging point 11 and so that the line of the axis 9 of the link can be swung under the inclined mixing vessel when in charging position to intersect vertical lines drawn through the opening of the vessel as shown in the drawing thereby permitting the loader bucket to stand close to the main frame when it is deposited on the ground. This fact also shortens and makes more direct the pull of the cables 13.

Figure 4:
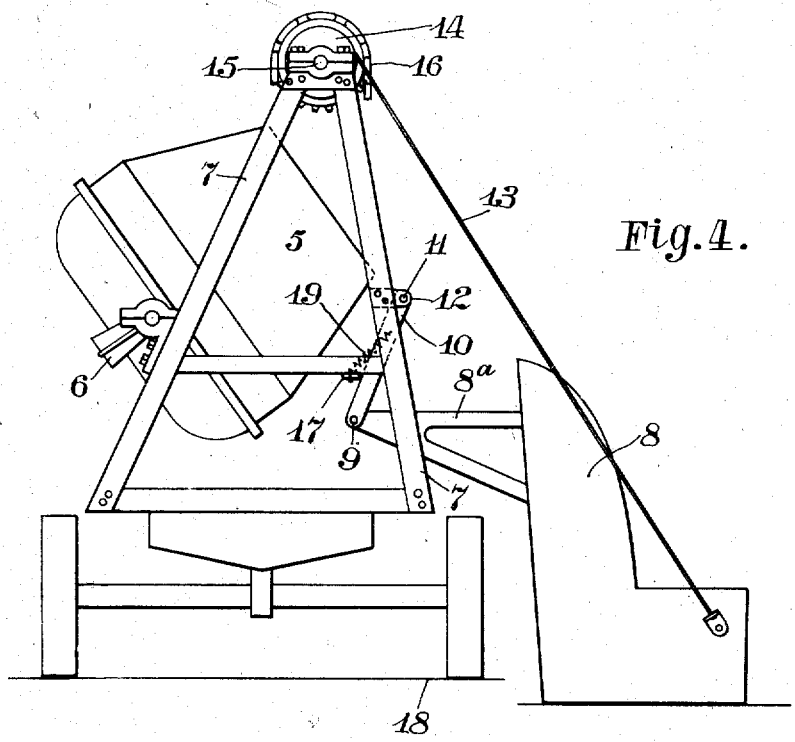
Fig. 4 is a view like Fig. 1 showing a modification.

If it be desired that the loader bucket when lowered shall rest upon a plane 18 below the plane of the bottoms of the truck wheels a link frame 10 with longer side bars can be substituted for the corresponding parts shown in Figs. 1, 2 and 3 and as illustrated in Fig. 4 where the bucket is shown as resting on a level below that occupied by the wheels.

A coil spring 19 can be attached to the link and the stop bar adapted to have its tension increased when the bucket is raised to aid in drawing the loader bucket from its charging position especially if it passes the center of gravity in going to charging position.

Figure 2:
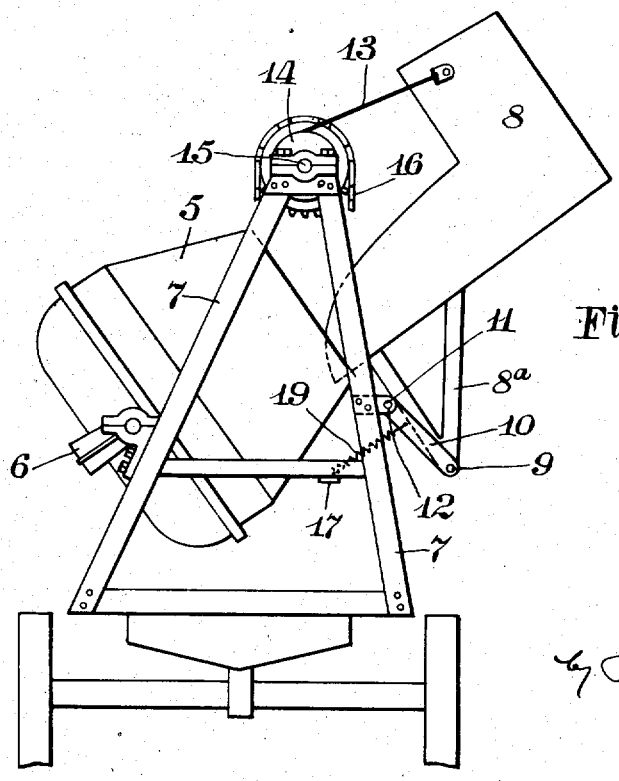
Fig. 2 is a similar view showing the loader raised to position to discharge its contents into the mixing drum.
Figure 3:
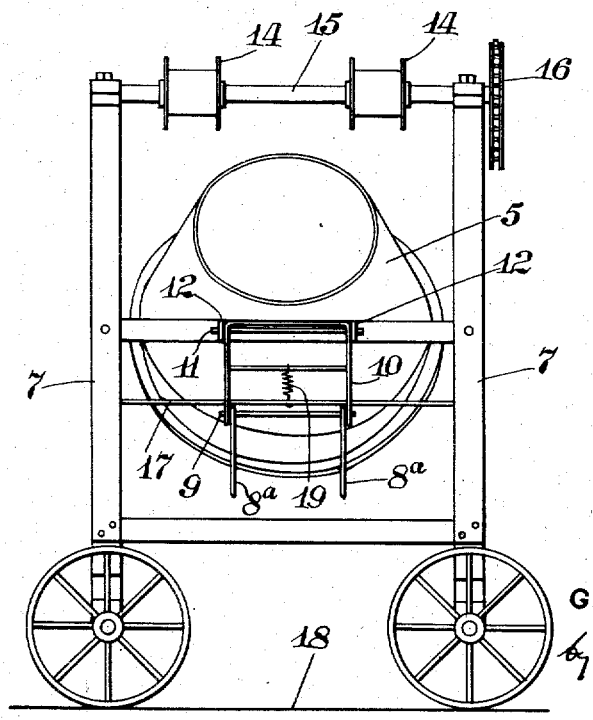
Fig. 3 is a view in elevation looking at the left hand side of Fig. 1 with the loader vessel removed.

In operation the cables raise the bucket initially about the axis 9 until the extensions 8ª abut against the upper portion of the link frame after which the bucket turns on the axis 11 to discharging position as indicated in Fig. 2.

The forms of the parts can be changed without departing from the gist of the invention as claimed.

What I claim is:

1. The combination with a mixing vessel and a frame for supporting the same, of a loader bucket for the mixing vessel, means for pivoting said bucket with reference to the frame consisting of a pendently hinged link, said link having a hinged connection at its free end with the loader bucket, and means for raising the bucket first on the lower axis and then on the other to mixing vessel charging position.

2. The combination with a mixing vessel and a frame for supporting the same, of a loader bucket for the mixing vessel, means for pivoting said bucket with reference to the frame consisting of a pendently hinged link to oscillate from one side of a vertical line from its hinging axis to the other, said link having a hinged connection at its free end with the loader bucket, and means for raising the bucket first on the lower axis and then on the other to mixing vessel charging position.

3. The combination with a mixing vessel and a frame for supporting the same, of a loader bucket for the mixing vessel, means for pivoting said bucket with reference to the frame consisting of a pendently hinged link, said link having a hinged connection at its free end with the loader bucket, and means for raising the bucket first on the lower axis and then on the other to mixing vessel charging position and a stop for limiting the swing of said link at its innermost position.

4. The combination with a mixing vessel and a frame for supporting the same, of a loader bucket for the mixing vessel, means for pivoting said bucket with reference to the frame consisting of a pendently hinged link, said link having a hinged connection at its free end with the loader bucket, means for raising the bucket first on the lower axis and then on the other to mixing vessel charging position, and a spring acting on said bucket tending to draw it from said charging position.

5. The combination with a mixing vessel adapted to swing from charging to a discharging position and a frame for supporting the same, of a bucket for charging the mixing vessel, means for pivoting said bucket including a pendent link hinged at it upper end with reference to said supporting frame and having said bucket hinged thereto at its lower or free end, said pendent link adapted to swing from the outer side of the vertical plane of the axis of said upper hinge to a vertical plane parallel to the swinging axis of the mixing vessel and intersecting the charging opening of said mixing vessel when the latter is in charging position, and means for raising the bucket to charging position on said hinging connections.

6. The combination with a mixing vessel adapted to swing from a charging to a discharging position and a frame for supporting the same, of a bucket for charging the mixing vessel, means for pivoting said bucket including a pendent link hinged at its upper end with reference to said supporting frame and having said bucket hinged thereto at its lower or free end, said pendent link adapted to swing from the outer side of the vertical plane of the axis of said upper hinge to a position beneath the charging end of the mixing vessel when the latter is in charging position, and means for raising the bucket to charging position on said hinging connections.

GEBHARD JAEGER.